May 30, 1950      I. W. M. HARKER ET AL      2,509,639
DRIVE MECHANISM
Filed April 27, 1948
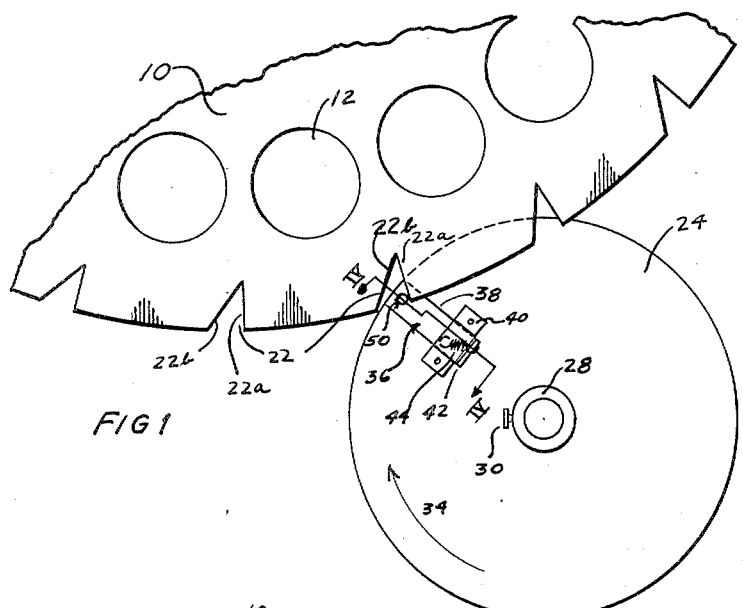
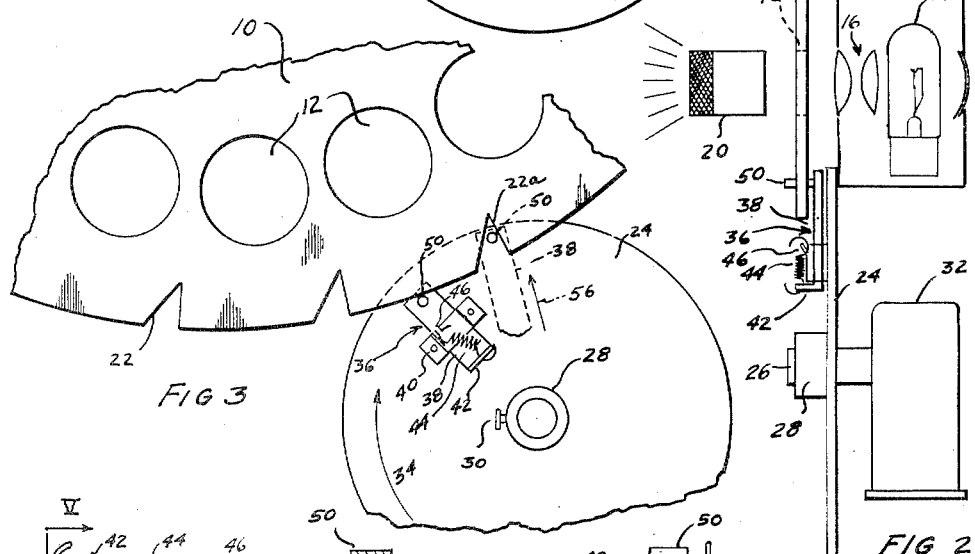
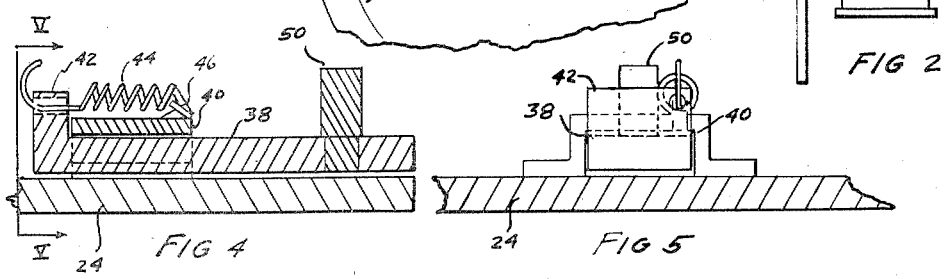
INVENTORS:
Ian W. M. Harker and
Robert Grunwald Patented May 30, 1950

2,509,639

UNITED STATES PATENT OFFICE 2,509,639

DRIVE MECHANISM

Ian W. M. Harker and Robert Grunwald, Oak Park, Ill.

Application April 27, 1948, Serial No. 23,447

1 Claim. (Cl. 74—436)

Our invention relates to drive mechanisms for causing rotations of a driven wheel in successive angular increments.

In one type of projector for automatically projecting a succession of images on a viewing screen, in timed sequence, a slide or picture wheel is disposed for rotation about its axis and is provided with a plurality of equally spaced openings near its periphery. Each of these openings is provided with suitable holding means to receive a transparency for projection and is positioned at a predetermined radial distance from the center of the slide wheel, and at a predetermined angular distance from the adjacent openings. An optical mechanism is provided to project the image of the particular transparency aligned therewith. A drive mechanism is provided for the wheel to cause the pictures successively to be aligned with the optical system to cause a succession of images in timed sequence, thus displaying a visual program.

In accordance with the present invention, an improved drive mechanism for a slide projector of the foregoing type is provided. The slide wheel is notched along its periphery at angular increments corresponding to the angular increments between adjacent transparency receiving openings and an arm with a drive pin to engage these notches is rotated to cause successive engagements therewith. The arm is biased in direction to engage the notches and is mounted for rotation with a drive wheel. The arm is slidably supported relative to the drive wheel and is biased in a radial direction relative to the slide under all conditions when it engages the periphery of that wheel.

During normal synchronized driving action, the arm of the drive wheel shifts the slide wheel an angular increment sufficient to cause engagement with adjacent notches of the slide wheel on successive rotations without sliding along the periphery thereof a substantial distance. However, if for any reason the slide wheel is in a displaced or non-synchronous position relative to the optical mechanism and thus is incapable of displaying a complete image on the viewing screen, the arm will ride against the periphery of the slide wheel and shift radially inwardly in accordance with the configuration of the periphery of the slide wheel. When the arm becomes aligned with a notch in the slide wheel, it slides therein under the radially outward biasing action of the spring mechanism and rides on the edge thereof to drive the slide wheel the remainder of the distance necessary to position a slide before the optical mechanism. On subsequent rotations of the drive wheel, the arm thereof engages the notches of the slide wheel in normal fashion to reproduce the visual program.

It is accordingly a general object of the present invention to provide an improved drive mechanism to rotate a wheel in successive angular increments.

It is a further object of the present invention to provide an improved mechanism for rotating a wheel in successive angular increments and which is operable to restore synchronism of the driven wheel in a single cycle of rotation.

Yet another object of the present invention is to provide an improved mechanism for rotating a wheel in successive angular increments and which includes features of combination, construction and arrangement whereby low cost, simplicity, and reliable operation are achieved.

Still another object of the present invention is to provide an improved drive mechanism for a slide projector of the automatic type.

The novel features of our invention are pointed out with particularity in the appended claim. Our invention itself however, together with further objects and advantages thereof, may best be understood by reference to the following description taken in connection with the accompanying drawing in which:

Figure 1 is a fragmentary front elevational view of a slide projector incorporating a drive mechanism constructed in accordance with the principles of the present invention.

Figure 2 is a side elevational view of the mechanism of Figure 1 and showing the optical elements in position.

Figure 3 is a view like Figure 1 but showing the operation of the mechanism of the present invention when the drive wheel is out of synchronism with the slide wheel.

Figure 4 is a fragmentary cross sectional view through the axis IV—IV, Figure 1, and showing the biasing spring in elevation.

Figure 5 is a fragmentary cross sectional view through the axis V—V, Figure 4.

Referring now to the views of Figures 1 and 2 there is shown a main slide or picture wheel 10 having a plurality of circular openings or windows 12, located along a common radius relative to the center of the wheel and at equal angular increments. Mechanism (not shown) is provided to mount a slide or picture in each one of these circular openings so that when light is shown therethrough and properly focused on a viewing screen, an image of the transparency is displayed.

Such mechanism may, for example, include a light source 14, Figure 2, together with a condensing lens system indicated generally at 16, Figure 2, to cause parallel rays of light to pass through the opening 12 aligned with the lens 16. As shown in Figure 2, the source 14 and the lens 16 may be mounted in an appropriate housing 18 which is fixedly mounted by suitable means (not shown). A focusing lens unit 20 is before the opening 12 to focus the image of the transparency disposed in the opening 12 on a suitable viewing screen (not shown).

The picture wheel 10 is provided with a plurality of triangular pin-engaging notches 22 on its outer periphery, each of these notches being positioned between two of the openings 12, and defining an opening to receive the drive pin. Each notch further has a radially extending forward pin engaging wall 22a and a radially slanting rear wall 22b.

A circular drive wheel 24 is mounted below and to the right of the slide wheel 10 and is sustained for rotation with shaft 26 by the bushing 28 and the set screw 30. The shaft 26 is connected to drive motor 32 which causes that shaft to rotate in the direction of arrow 34, Figure 1. The drive motor 32 may, for example, be an electric motor and is constructed to execute one cycle of rotation in the timed interval between successive images on the viewing screen.

The yielding catch assembly indicated generally at 36 is mounted on the surface of drive wheel 24 to engage the edge portions 22a of the slide wheel 10 and cause the desired successive rotations of the latter wheel. This assembly includes a shiftable arm 38 which is held against the surface of the wheel 24 by the guide 40. This guide is of U shaped cross section as shown in Figure 5 and encircles the arm to limit shifting movements thereof to a radial direction relative to the wheel 24. The guide 40 is spot welded to the drive wheel 24.

The arm 38 is biased radially outwardly to urge the upstanding stop lug 42 against the guide 40. This is accomplished by spring 44, which rides on pin 46, Figure 4, which rides against the lug 42 and the cut-out of the guide 40, thereby drawing arm 38 radially outwardly and tending to cause the pin 42 to engage the edge of guide 40.

The arm 38 is also provided with a pin 50 which extends in the direction of the axis of the wheel 24 and engages the outer periphery of the wheel 10 as shown in the side view of Figure 2. This pin further rides in the notches 22 of the wheel 10 to cause the driving engagements that progressively shift the wheel over predetermined angular increments upon each revolution of the drive wheel 24.

The method of operation of the mechanism of the present invention may best be understood by reference to Figure 3. In the condition shown by the solid lines of this figure the arm 38 is shown bearing against the slide wheel 10 at a point where the latter does not have a notch in its periphery. Due to the engagements between the arm 36 and the guide 40, the former is free to move only radially inwardly relative to drive wheel 24. However, this motion is opposed by spring 44, Figure 1, which spring causes the increased force to be exerted against the periphery of the slide wheel 10 as the arm 44 is retracted. This force urges the arm 24 against the periphery of the wheel 10. This periphery is relatively smooth so that the pin 50 slides across the surface thereof with relatively little tendency to rotate that wheel. Preferably a brake (not shown) is provided to assure that the slide wheel 10 does not rotate when the pin 50 rides against the periphery thereof.

When the wheel 34 has rotated to the point wherein the arm 38 is positioned as in the dotted lines of Figure 3, the force exerted by the spring 44 is in the direction of the arrow 56. This force drives the pin 50 into the notch 22 to cause that pin to engage the forward edge 22a of this notch and drive the wheel 10.

While we have described the operation of the arm 38 in engaging the wheel 10 only for the specific position shown in Figure 3, it will be evident that all the conditions wherein the pin 50 is engaged with the periphery of the wheel 10, the spring 44 acts to drive the arm 38 in a direction having a radial component relative to wheel 10 and hence in direction to cause the pin to ride into a notch 22 if such a notch is presented by wheel 10. Hence whatever the relative positioning of the wheels 10 and 24 may be, the pin 50 will ultimately ride into a notch 22 as rotation of wheel causes pin 50 to be aligned therewith.

In the normal operation of the present invention, the wheel 24 and the wheel 10 are aligned so that at each rotation of the wheel 24 the pin 50 rides into a notch 22 before it engages the periphery of the wheel 10 over any substantial distance and drives the latter wheel until the pin 50 rides out of the notch 22. However, if the two disks become displaced relative to each other, the pin 50 slides until the wheel 24 is aligned with a notch 22 and it then rides in the notch in the normal fashion. Thus only one rotation of the wheel 24 is required to restore synchronism to the apparatus if it becomes unsynchronized and there is no need for successive clawing engagements or the like to bring the unit into synchronism.

It should further be observed that there is no need for precise adjustments in the apparatus of the present invention for the reason that the ability of the pin 50 to slide on the periphery of the wheel 10 provides an automatic means of compensating for any discrepancy between the amount the pin wheel 10 rotates on each rotation of the wheel 24 and the distance between adjacent notches 22.

The structure of the present invention is an improvement over the apparatus described in our copending application S. N. 735,685, filed March 19, 1947, and entitled Automatic slide projector.

While we have shown and described a specific embodiment of our invention it will be understood that various modifications and alternative constructions may be made therein without departing from our true invention. We therefore contemplate by the appended claim all such modifications and alternative constructions as fall within the true spirit and scope of our invention.

What we claim as new and desire to secure by Letters Patent of the United States is:

A drive mechanism for rotating a driven wheel having peripheral notches, said mechanism including in combination a drive wheel mounted for rotation about an axis substantially parallel to the axis of said driven wheel, a guide affixed to said drive wheel and defining a radially extending channel in conjunction therewith, an arm slidably received in said channel for radial movements relative to said drive wheel, said arm having a pin at its outer end to engage the periphery of said driven wheel or to ride into said notches, said arm further having a turned-up portion on its inner end adapted to bottom against said guide to limit the outward movements thereof, and a spring having its ends affixed to said guide and the turned-up portion of said arm to urge said arm to the radially extending position.

IAN W. M. HARKER.
ROBERT GRUNWALD.

REFERENCES CITED

The following references are of record in the file of this patent:

UNITED STATES PATENTS

| Number | Name | Date |
|---|---|---|
| 699,051 | Wilson | Apr. 29, 1902 |
| 1,221,097 | Schweitzer | Apr. 3, 1917 |
| 1,481,773 | Brake | Jan. 22, 1924 |
| 1,914,797 | Baker | June 20, 1933 |